(12) United States Patent
Neal et al.

(10) Patent No.: US 11,858,214 B2
(45) Date of Patent: Jan. 2, 2024

(54) 3D PRINTER WITH SELF-SUPPORTING THERMAL ISOLATOR

(71) Applicant: Stratasys, Inc., Eden Prairie, MN (US)

(72) Inventors: Kyra Elizabeth Neal, Crystal, MN (US); Colin Adam Schiel, Chaska, MN (US); Patrick Williams Anderson, Maple Grove, MN (US); Bryan Daniel Migliori, Lakeville, MN (US)

(73) Assignee: Stratasys, Inc., Eden Prairie, MN (US)

( * ) Notice: Subject to any disclaimer, the term of this patent is extended or adjusted under 35 U.S.C. 154(b) by 286 days.

(21) Appl. No.: 17/221,136

(22) Filed: Apr. 2, 2021

(65) Prior Publication Data

US 2022/0314542 A1  Oct. 6, 2022

(51) Int. Cl.
*B29C 64/25* (2017.01)
*B29C 64/364* (2017.01)
(Continued)

(52) U.S. Cl.
CPC ............ *B29C 64/25* (2017.08); *B29C 64/295* (2017.08); *B29C 64/364* (2017.08); *B33Y 30/00* (2014.12); *B33Y 40/00* (2014.12)

(58) Field of Classification Search
CPC .......... B29C 64/25; B33Y 30/00; B33Y 40/00
See application file for complete search history.

(56) References Cited

U.S. PATENT DOCUMENTS 2,220,939 A   11/1940  McGuire
4,574,860 A    3/1986  Weiss
(Continued)

FOREIGN PATENT DOCUMENTS

CA   2190796 C  *  7/2002  .............. E04B 9/00
EP   1204517 A1     5/2002
(Continued)

OTHER PUBLICATIONS

U.S. Patent Office issued prosecution for U.S. Appl. No. 16/327,564, filed Feb. 22, 2019, including: Advisory Action and AFCP Decision dated Jan. 18, 2022, 5 pages; Final Rejection dated Sep. 24, 2021, 14 pages; Non-Final Rejection dated May 21, 2021, 10 pages; Requirement for Restriction and Election dated Mar. 16, 2021, 9 pages; 38 pages total.

(Continued)

*Primary Examiner* — Nahida Sultana
*Assistant Examiner* — Jamel M Nelson
(74) *Attorney, Agent, or Firm* — Peter J. Ims; Westman, Champlin & Koehler, P.A.

(57) ABSTRACT

A build chamber for a 3D printer includes a heated build space in an interior of the build chamber and a thermal isolator configured to insulate 3D printer components from the heated build space. The thermal isolator includes a first baffle section and a second baffle section. Each of the first baffle section and the second baffle section includes an accordion-pleated panel having a length, a width, a first end and a second end, wherein the panel comprises a parallel alternating top folds and bottom folds along the width forming a series of pleats, and each pleat within the series being configured to expand and contract, and wherein the panel is constructed of a heat-resistant material. Each baffle section also includes support rods affixed to the accordion-pleated panel in parallel to the pleats and at intervals along the length of the panel, the support rods substantially spanning the width of the panel. Ends of the support rods rest on surfaces proximate a ceiling of the build chamber to support the first and second baffle sections wherein the support rods are configured to provide sufficient strength and rigidity to the panel to substantially prevent the panel from sagging or buckling as the panel is expanded and contracted along its length.

16 Claims, 6 Drawing Sheets

(51) Int. Cl.
*B29C 64/295* (2017.01)
*B33Y 40/00* (2020.01)
*B33Y 30/00* (2015.01)

(56) References Cited

U.S. PATENT DOCUMENTS

| | | | |
|---|---|---|---|
| 5,312,224 | A | 5/1994 | Batchelder et al. |
| 5,764,521 | A | 6/1998 | Batchelder et al. |
| 6,547,995 | B1 | 4/2003 | Comb |
| 6,722,872 | B1 | 4/2004 | Swanson et al. |
| 7,297,304 | B2 | 11/2007 | Swanson et al. |
| 7,891,964 | B2 | 2/2011 | Skubic et al. |
| 8,955,558 | B2 | 2/2015 | Bosveld et al. |
| 2012/0164256 | A1 | 6/2012 | Swanson et al. |
| 2013/0078073 | A1 | 3/2013 | Comb et al. |
| 2013/0295513 | A1* | 11/2013 | Ferry ............... C30B 11/003 432/253 |
| 2015/0096266 | A1 | 4/2015 | Divine et al. |
| 2019/0210284 | A1 | 7/2019 | Bosveld |
| 2019/0240904 | A1 | 8/2019 | Swanson et al. |
| 2019/0322048 | A1 | 10/2019 | Huitema et al. |
| 2021/0205679 | A1* | 7/2021 | Moody, Jr. ............ A63B 55/406 |

FOREIGN PATENT DOCUMENTS

| | | | |
|---|---|---|---|
| WO | WO-0078519 A1 * | 12/2000 | ............. B29C 41/36 |
| WO | 2016014543 A1 | 1/2016 | |

OTHER PUBLICATIONS

Fig.1 is a photo of the prior art Stratasys Inc. MOJO 3D printer with top removed, dated Dec. 31, 2013.
Fig. 2 is a photo of the thermal barrier of the prior art Stratasys Inc. MOJO 3D printer, dated Dec. 31, 2013.
Fig. 3 is a photo of the thermal barrier of the prior art Stratasys Inc. MOJO 3D printer, dated Dec. 31, 2013.
Fig. 4 is a photo of the thermal barrier of the prior art Stratasys Inc. MOJO 3D printer, dated Dec. 31, 2013.
Fig. 5 is a photo of the thermal barrier of the prior art Stratasys Inc. MOJO 3D printer, dated Dec. 31, 2013.
Fig. 6 is a photo of the prior art Stratasys, Inc. MOJO 3D printer, dated Dec. 31, 2013.
International Search Report and Written Opinion dated May 17, 2017 for PCT/US2016/051297, filed Sep. 12, 2016.
Office Action from Chinese patent application No. 201690001742. 9, dated Sep. 17, 2019.

* cited by examiner

3D PRINTER WITH SELF-SUPPORTING THERMAL ISOLATOR

BACKGROUND

The present disclosure relates to additive manufacturing systems for 3D printing of parts by material extrusion techniques. In particular, the present disclosure relates to a 3D printer having a heated environment and capable of printing parts from high-temperature materials. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, powder bed fusion, binder jetting, direct energy deposition, electrophotographic imaging, and vat photopolymerization (including digital light curing and stereolithographic processes).

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in multiple degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

High-temperature materials printed using material extrusion techniques are desirably extruded into heated build chamber, aka a hot oven. There is a continued need for oven designs that are capable of printing large parts.

SUMMARY

An aspect of the present disclosure is directed to a build chamber for a 3D printer. The build chamber includes a heated build space in an interior of the build chamber and a thermal isolator configured to insulate 3D printer components from the heated build space. The thermal isolator includes a first baffle section and a second baffle section. Each of the first baffle section and the second baffle section includes an accordion-pleated panel having a length, a width, a first end and a second end, wherein the panel comprises parallel alternating top folds and bottom folds along the width forming a series of pleats, and each pleat within the series being configured to expand and contract, and wherein the panel is constructed of a heat-resistant material. Each baffle section also includes support rods affixed to the accordion-pleated panel in parallel to the pleats and at intervals along the length of the panel, the support rods substantially spanning the width of the panel. Ends of the support rods rest on surfaces proximate a ceiling of the build chamber to support the first and second baffle sections wherein the support rods are configured to provide sufficient strength and rigidity to the panel to substantially prevent the panel from sagging or buckling as the panel is expanded and contracted along its length.

Another aspect of the present disclosure relates to a 3D printer having a heated chamber and at least one print head configured to move in an x-y plane to print the layers of a part. The 3D printer includes a thermal isolator configured to insulate components on an inlet side of the print head from the heated build space and forming a portion of a ceiling of the heated chamber. The thermal isolator includes a first baffle section and a second baffle section secured to components that engage the print head and/or move the print head in the x-y plane. Each of the first baffle section and the second baffle section includes an accordion-pleated panel having a length, a width, a first end and a second end, wherein the panel comprises a parallel alternating top folds and bottom folds along the width forming a series of pleats, and each pleat within the series being configured to expand and contract, and wherein the panel is constructed of a heat-resistant material. Each of the first and second baffle sections also includes support rods affixed to the accordion-pleated panel in parallel to the pleats and at intervals along the length of the panel, the support rods substantially spanning the width of the panel. Ends of the support rods rest on surfaces proximate a ceiling of the build chamber to support the first and second baffle sections and the support rods are configured to provide sufficient strength and rigidity to the panel to substantially prevent the panel from sagging or buckling as the panel is expanded and contracted along its length.

DETAILED DESCRIPTION

The present disclosure is a self-supporting thermal isolator for a 3D printer that builds objects by extruding material from an extrusion nozzle of a print head onto a platen located in a heated build chamber. The thermal isolator forms a portion of a ceiling of the heated chamber and is configured to insulate components on an inlet side of the print head from the heated build space while an extrusion nozzle of the print head moves within a build plane of the heated build chamber. The print head inlet and motion control components of the printer are isolated from the heated chamber so that the temperature in the heated chamber is not limited by the temperature limits of these printer components. The apparatus enables the building of objects from high-temperature materials and the self-supporting feature facilitates use of the isolator in large-scale 3D printers.

The self-supporting thermal isolator of the present disclosure has one end that attaches proximate a top edge of the build chamber and another end that secures to components that engage the print head and/or move the print head in an x-y plane, where the thermal isolator or barrier expands and contracts to maintain the thermal barrier between the heated chamber and the print head electronics and gantry, as the gantry or gantry bridge is moved back and forth in an x-direction as 3D parts are printed in a layer-by-layer manner. The self-supporting thermal barrier includes lightweight support rods that span a width of the chamber and are capable of withstanding high temperatures, and where ends of the support rods move along substantially planar surfaces proximate a ceiling of the heat chamber.

As 3D printers become larger in scale, a thermal barrier or isolator that moves with the print head needs to span a larger length and width. Large-scale 3D printers include build envelopes that are 24 in. by 24 in. (576 sq. in.), 24 in. by 40 in. (970 sq. in.), 32 in. by 40 in. (1,280 sq. in.) and higher. A larger-scale thermal barrier can sag or buckle into the print plane and interfere with a part being printed. There is a need for a light-weight, self-supporting expandable and contractable thermal barrier that does not sag or buckle. However, the presently disclosed thermal barrier or isolator can also be used with 3D printers with smaller build envelopes.

The present disclosure utilizes a self-supporting thermal isolator that is constructed with accordion folds that allow the thermal isolator to expand and contract as the print head moves in an x-y build plane of the heated build chamber. The thermal isolator includes a first baffle section and a second baffle section, each of which comprises an accordion-pleated panel. Due to the size of the large-scale 3D printers, an un-reinforced thermal isolator is typically not sufficiently rigid by itself to be self-supporting and can sag and/or buckle as the part is printed, resulting in printing errors or interference with the movement of the print head. The present disclosure utilizes spaced apart support rods secured to or within the thermal isolator as stiffeners for the baffle sections. The support rods substantially span a width of each baffle section of the thermal isolator and are in alignment with the accordion folds. The support rods are sufficiently strong or rigid to retain the thermal isolator or barrier in alignment with the print head carriage while being sufficiently light weight to be moved with the same drive as used to move the unsupported thermal isolator. It is typical that the rods are minimal in diameter or cross-section, in order to ensure that movements of the print head gantry are not impeded by a lack of contractability of the thermal isolator. If the rod diameters are too thick, they will make the contracted dimension of the thermal isolator too large to allow for adequate gantry movement to the outside edges of the print space.

Due to economic constraints on the cost of the thermal isolators and the size of the actuators for moving the print head carriage, lightweight and inexpensive materials are utilized that provide the necessary expansion and contraction while being able to withstand high chamber temperatures and providing the necessary thermal insulation or barrier for electronics and print head movement apparatuses. A non-limiting, exemplary material of construction includes polytetrafluoroethylene (PTFE) coated fiberglass.

Figure 1:
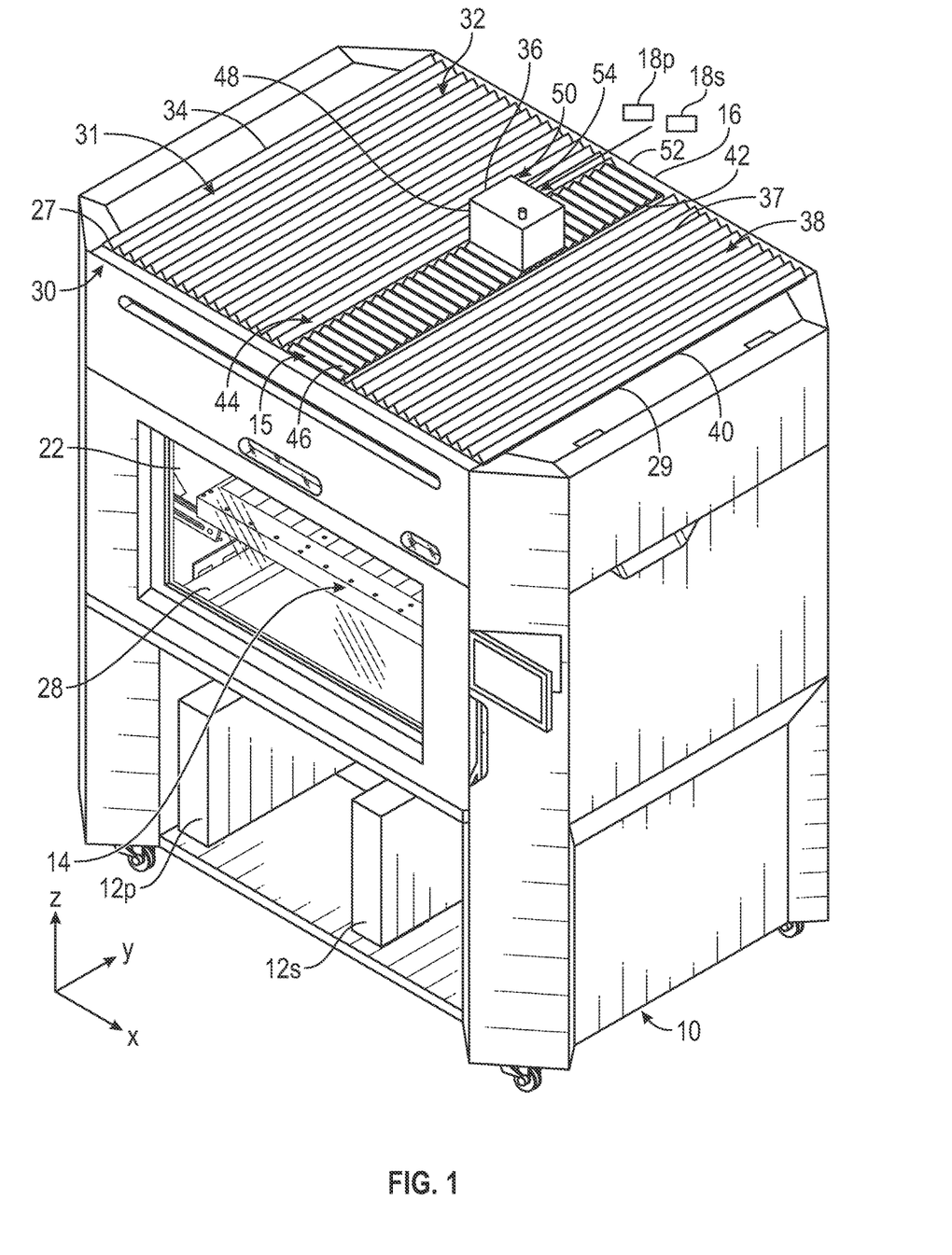
FIG. 1 is a perspective, cut away view of a 3D printer showing a thermal barrier for a heated chamber.

The present disclosure may be used with any suitable extrusion-based 3D printer. For example, FIG. 1 illustrates a schematic view of an exemplary 3D printer 10 that has a substantially horizontal print plane, and where the part is printed and indexed in a substantially vertical z-direction on a build platen assembly 14 having a substantially planar surface 16 in the x-y plane. Parts are printed in a layer-by-layer manner moving a print head carriage 16 that carries print heads 18p and 18s in a x-y plane. The shown embodiment has an H-style x-y gantry, with gantry bridge 15 used for moving the print head carriage 16. The print heads 18p and 18s extrude part material and optional support material supplied by consumable assemblies, 12p for part material and 12s for support material.

Exemplary 3D printer 10 prints parts or models and corresponding support structures from the part and support material filaments, respectively, of consumable assemblies 12, by extruding roads of molten material along toolpaths. During a build operation, successive segments of consumable filament are driven into an inlet end of print head 18p and 18s where they are heated to a molten state in a liquefier within the print head. The molten material is extruded through nozzle tip in a layer-wise pattern to produce printed parts. Suitable 3D printers 10 include fused deposition modeling systems developed by Stratasys, Inc., Eden Prairie, MN under the trademark "FDM".

After layers are printed in the x-y plane, the platen assembly 14 is incremented downward a height of a layer in the z-direction. The process of printing a layer in the x-y plane by moving a print head carriage 16 supporting the print heads 18p and 18s until a layer is printed and then indexing the platen assembly 14 a height of a layer in the z-direction is continued until the 3D part is printed.

The 3D printer includes a heated build chamber 22 that contains the platen assembly 14 and an extrusion tip for each print head 18p and 18s, such that the 3D part is printed at a suitable warmer than ambient temperature for a particular material. The heated chamber includes a thermal isolator 30 that allows the print heads 18p and 18s electronics portions to be located outside the heated space, while the tip of the print head prints in a x-y plane within the heated chamber. The thermal insulator 30 includes baffle sections on either side of the print heads which move in concert with the gantry bridge 15, to maintain the heated thermal space while insulating printer components from the heated chamber, such as disclosed in Swanson U.S. Pat. No. 6,722,872 and in Bosveld U.S. Patent Application Publication 2019/0210284 which discloses pleated insulators that are removably attached to the central portion. In other embodiments, the print head moves within the gantry bridge and the left and right thermal insulators attached to the central portion maintain their length as the insulators move, such as disclosed in Swanson U.S. Pat. No. 10,688,721.

As illustrated, the thermal isolator 30 includes a first baffle section 32 having a left end 34 connected to the 3D printer 10 proximate a left edge 27 of the chamber 28, and a right end 36 connected to the gantry bridge 15. The thermal isolator 30 includes a second baffle section 38 having a right end 40 connected proximate a right edge 29 of the chamber 22 and a left end 42 connected to the gantry bridge 15. The baffle sections 32 and 38 expand and contract as the gantry bridge 15 moves in the x-direction.

The first and second baffle sections 32 and 38 are similarly constructed and include an accordion-pleated panel comprising a plurality of alternating top and bottom folds 31 and 37, respectively, that span a width of each baffle section 32 and 38 in a y-direction, forming a series of pleats configured to expand and contract in the x-direction. Support rods 100 are affixed to the baffle sections 32 and 38 in parallel to the pleats and at intervals along the length of the panel, the support rods substantially spanning the width of the panel. The support rods 100 are configured to provide sufficient strength and rigidity to the panel to substantially prevent the panel from sagging or buckling as the panel is expanded and contracted along its length.

The thermal isolator 30 may optionally include y-direction baffles within a tray of the gantry bridge 15. The thermal isolator 30 illustrated in FIGS. 1 and 2 includes a front baffle section 44 having a front end 46 attached to a front end of the gantry bridge 15 and a back end 48 attached proximate the print heads 18p and 18s within the gantry bridge 15. The thermal isolator 30 also includes a back baffle section 50 having a back end 52 attached to a back end of the gantry bridge 15 and a front end 54 attached proximate the print heads 18p and 18s. The front and back baffle sections 50 and 52 include accordion folds in the y-direction, such that the print heads 18p and 18s can move in the y-direction which causes the front and back baffle section 44 and 50 to expand and contract. These y-direction baffles span a smaller area than the x-direction baffle sections 32 and 38, and optionally may utilize the support rods of the present invention.

Figure 2:
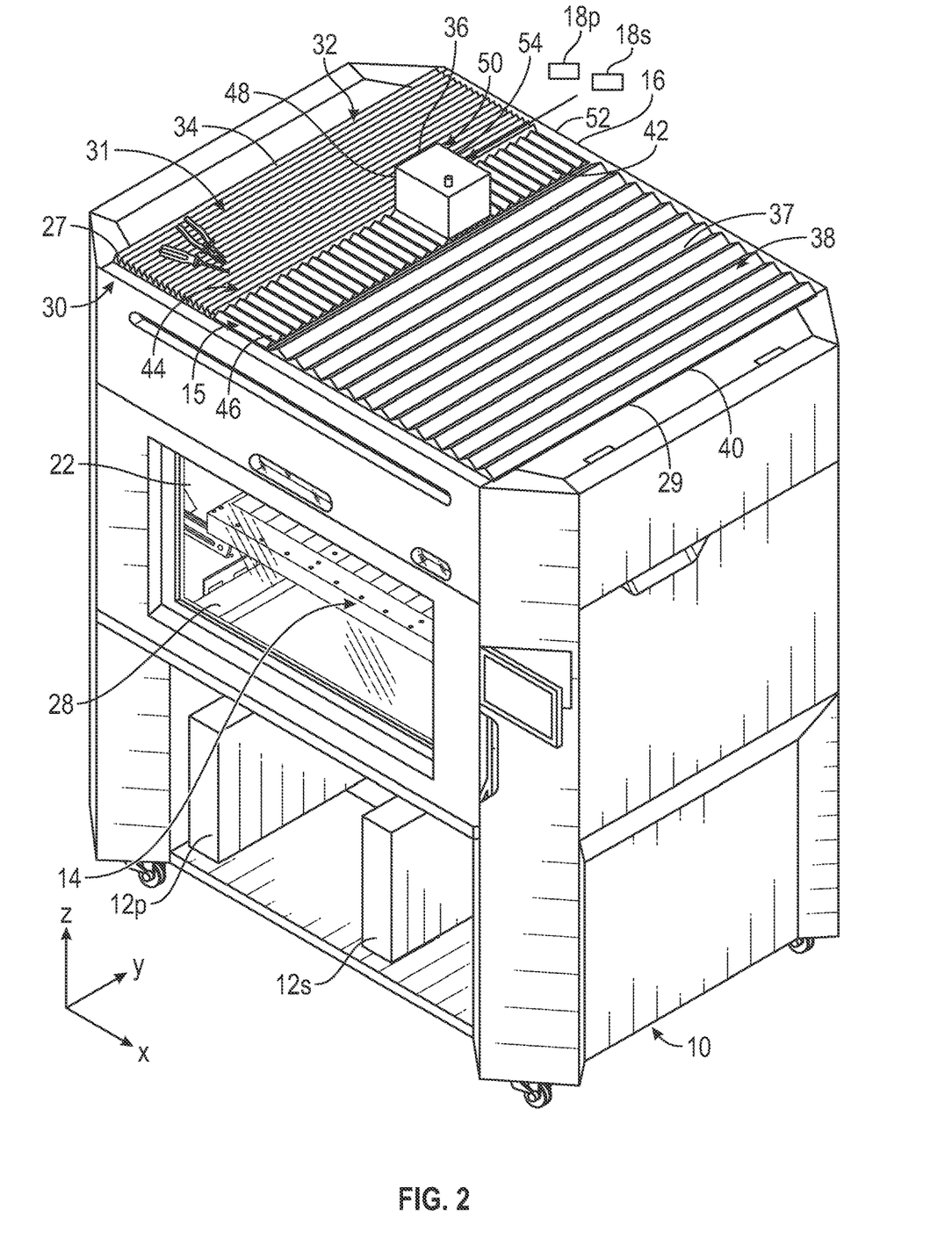
FIG. 2 is a perspective, cut away view the 3D printer showing tools supported on a contracted thermal barrier.

The thermal isolator 30 with the first and second baffle sections 32 and 38 and the optional front and back baffle sections 44 and 50 is configured to expand and contract in the x-direction as the print heads 18p and 18s move in the x-direction and is configured to expand and contract in the y-direction as the print heads 18p and 18s move in the y-direction. The combination of the first and second baffle sections 32 and 38 and optional front and back baffle sections 44 and 50, respectively, allows the print heads 18p and 18s to move in any direction in the x-y plane while acting as a ceiling of the heated chamber 28 to aid in maintaining a selected temperature within the heated chamber 28.

Referring to FIG. 2, the gantry bridge 15 is moved proximate a left edge of the chamber 28 such that the first baffle section 32 is contracted and the second baffle section 38 is expanded. As mentioned before, due to the increased width of the first and second baffle sections 32 and 38, spaced apart support rods are utilized within the accordion folds to retain the first and second baffle sections 32 and 38 in alignment with the gantry bridge 15 while preventing unwanted sagging or buckling of the first and second baffle sections 32 and 38. With the first baffle section 32 in a contracted configuration with the spaced apart support rods in closer proximity to each other, the first baffle section 32 is a capable of supporting one or more tools without sagging, damaging or adversely affecting the life of the first baffle section 32. Being capable of supporting tools is beneficial when working on large scale 3D printers, such as illustrated at 10, because the tools can be retained in close proximity to the operator in a location that does not interfere with the repair or replacement of parts. While the first baffle section 32 is illustrated in a contracted configuration and the second baffle section 38 is illustrated in an expanded configuration, it is also within the scope of the present disclosure to have the second baffle section 38 in the contracted configuration and capable of supporting tools while the first baffle section 32 is in the expanded configuration, or any intermediate position between the two extremes. The pleated thermal isolator must be able to contract and expand according to the movement of the gantry bridge 15. The support rods prevent the first and second baffle sections 32 and 38 from sagging during the expansion and contraction; with a large build size, the first and second baffle sections 32 and 38 will be large, and will need to expand and contract across the large space, without sagging into the thermal chamber. The baffle material itself would not be capable of supporting a large span, even with accordion folds. By way of non-limiting example, the first and second baffle sections 32 and 38 may contract to as small as 2.5" in width, and extend as large as 43" in width.

Figure 3:
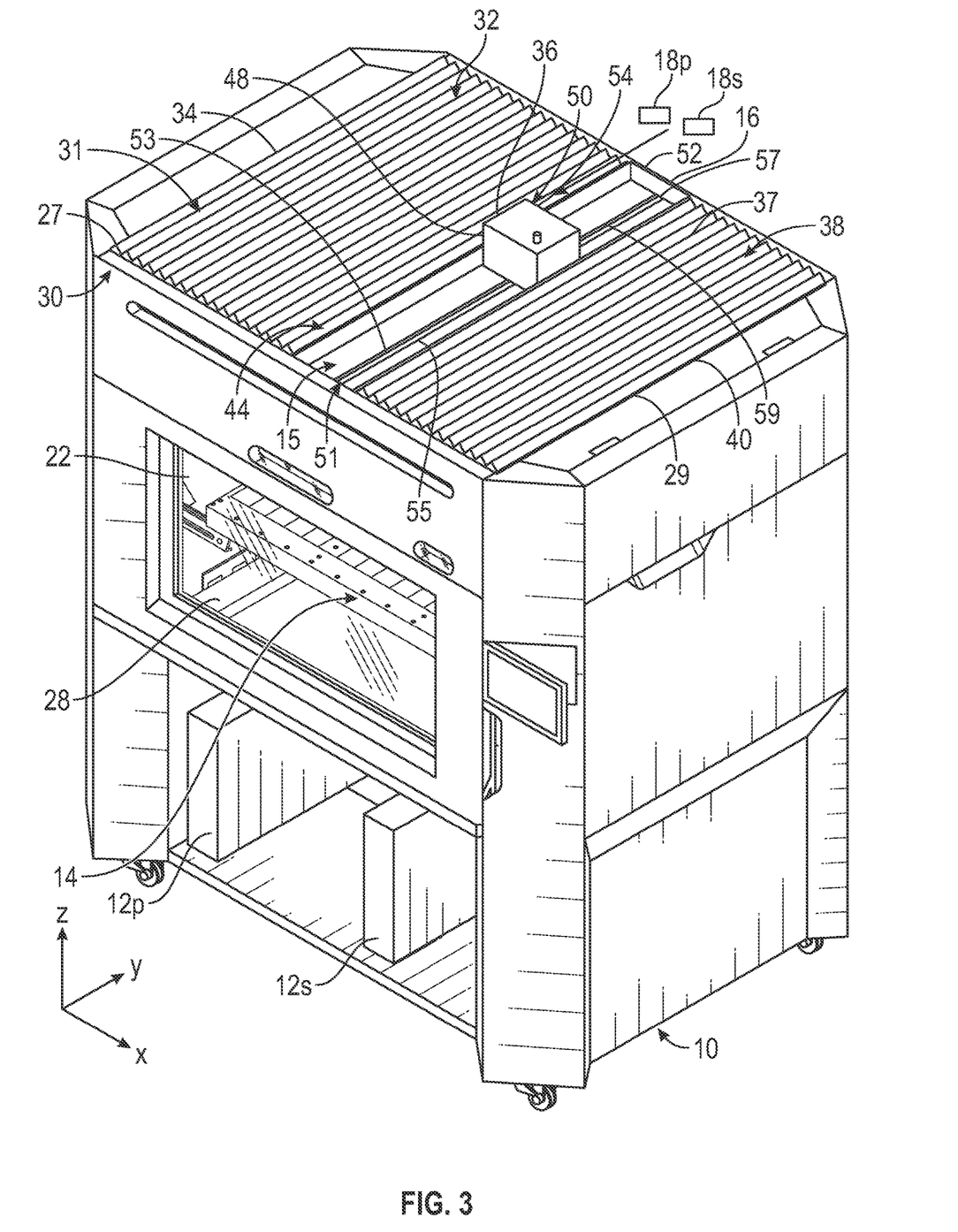
FIG. 3 is a perspective, cut away view of a 3D printer showing another thermal barrier for a heated chamber.
Figure 4:
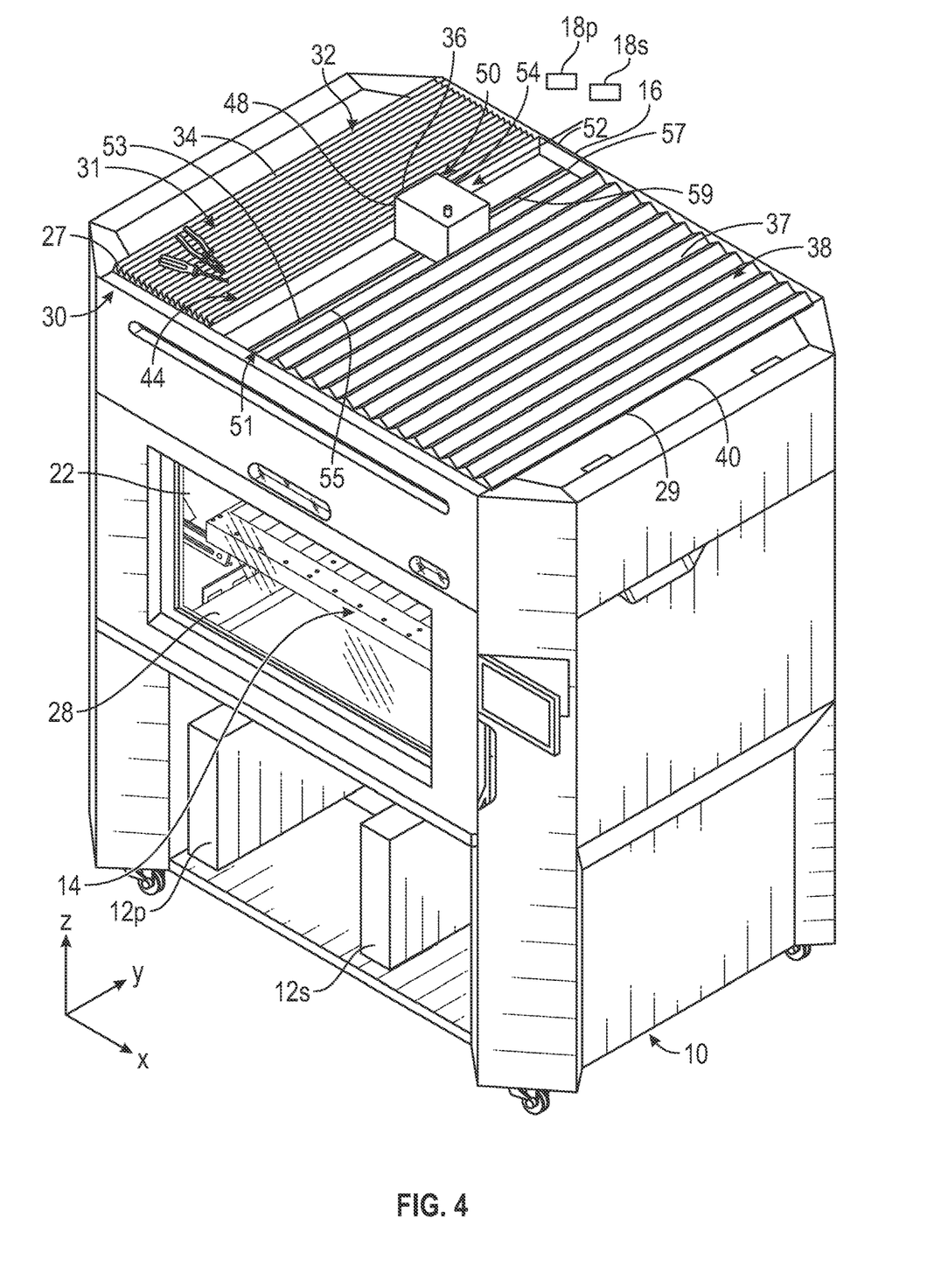
FIG. 4 is a perspective, cut away view the 3D printer showing tools supported on the contracted thermal barrier of FIG. 3.

Referring to FIGS. 3 and 4, the thermal isolator 30 may alternatively omit the y-baffles, and include a different isolator configuration within the gantry bridge 15 which holds the 3D print heads such that the print head tip portion projects through a deformable portion 51 extending substantially along a width, into the heated thermal chamber. The deformable portion 51 includes flaps 53 and 55 attached to the gantry bridge 15 along three edges of an opening 59, where edges within the gantry bridge 15 are free and form a slightly overlapping slit 57, Portions of the liquefiers and the nozzle tips of the print heads 18p and 18s extend through the slit 57, where the flaps 53 and 55 provide a thermal barrier to prevent the print heads 18p and 18s from creating a potentially large hot air leakage areas within the chamber 22, while allowing the print heads 18p and 18s to move freely along a length of the central portion 31. Maintaining the print heads 18p and 18s outside the heated chamber at a lower temperature aids in extending the life of their electrical components. The baffle flaps 53 and 55 are constructed of flexible, thermally tolerant fabric material, such as but not limited to polytetraafluoroethylene (PTFE) coated fiberglass, which can tolerate elevated thermal chamber temperature conditions while still permitting print head movement within the slit 57 maintaining closure of the flaps 53 and 55 adjacent to the print head movement path. However, other forms of thermal isolators within the gantry bridge 15 are within the scope of the present disclosure such as overlapping sheets with a slit therebetween.

Figure 5:
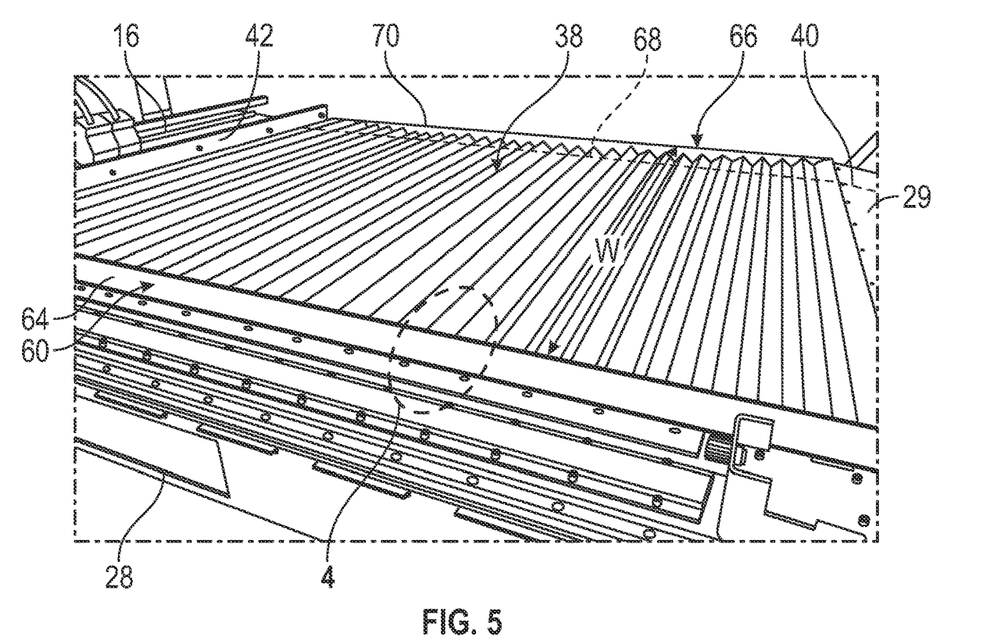
FIG. 5 is a perspective view of a baffle section in an expanded configuration in a 3D printer.
Figure 6:
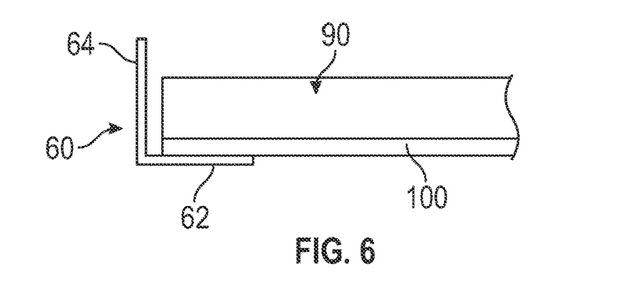
FIG. 6 is a close-up sectional view of a support rod supported by a "L" shaped member.

Referring to FIGS. 5 and 6, the second baffle section 38 is illustrated in an expanded configuration where the right end 40 is connected proximate the right edge 29 of the chamber 28 and a left end 42 connected to the gantry bridge 15. End portions of the support rods 100, whether located fully internally within the baffle fabric, or extending beyond the fabric, rest on substantially planar surfaces 62 and 68 of "L" shaped members 60 and 66 secured proximate the front edge and the back edge of the chamber 28. Vertical portions 64 and 70 of the "L" shaped members 60 and 66, respectively, limit movement of the second baffle section 38 in the y-direction as the second baffle section 38 expands and contracts in the x-direction. The first baffle section 32 is a mirror image of the second baffle section 38 and also utilizes the "L" shaped members to support the support rods 100 while limiting movement of the left thermal isolator 32 in the y-direction. While "L" shaped members 60 and 66 are illustrated and described, the support members can have any suitable configuration including, but not limited a vertical edge upon which the support rod is supported, upwardly or downwardly sloped engaging surfaces and/or arcuately shaped surfaces.

Figure 7:
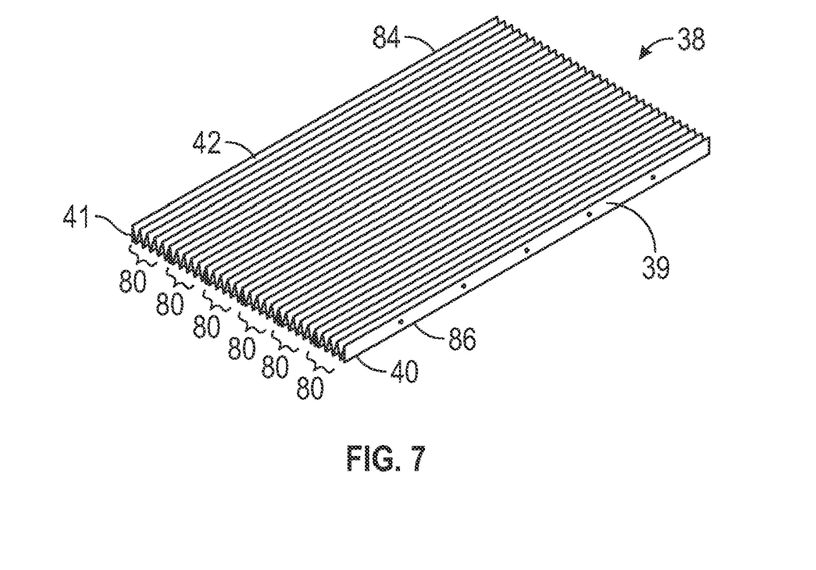
FIG. 7 is perspective view of the thermal barrier.
Figure 8:
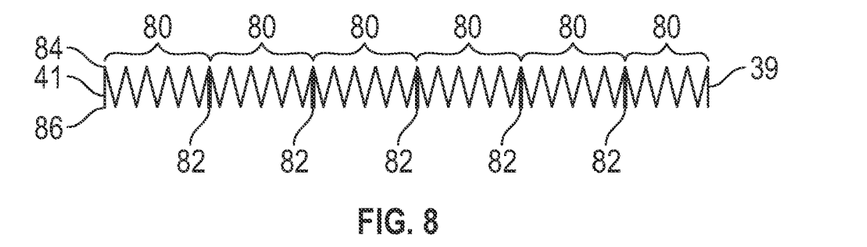
FIG. 8 is a front view of the thermal barrier.

Referring to FIGS. 7 and 8, the second baffle section 38 is further illustrated apart from the 3D printer. However, the same description applies to the first baffle section 32. FIGS. 7 and 8 illustrate the second baffle section 38 in a position between fully contracted and fully expanded. The second baffle section 38 includes a left end plate 41 proximate the left end 42 and configured to be attached to the gantry bridge 15 and a right end plate 39 proximate the right end 40 configure to be attached proximate a right edge of the chamber 28.

The second baffle section 38 includes a plurality of groups of pleats 80 that are separated by support rods 82 that are secured between the adjacent plurality of groups of pleats 80. As illustrated, the support rods 82 are spaced every five pleats from proximate a top edge 84 and hang proximate a bottom edge 86 such that the support rods 82 are configured to rest on the substantially horizontal portions of the "L" shaped members 60 and 62. While the support rods 82 are illustrated being spaced every five pleats, the support rods 82 can be spaced apart any suitable number of pleat ranging from about two pleats to about ten pleats depending upon the size of the thermal isolator and the material of construction and more particularly the support rods 82 can be spaced apart from about three pleats to about eight pleats depending upon the size of the thermal isolator and the material of construction. As another option, the support rods could be placed in each pleat. Larger or taller pleats may need more closely spaced rods; smaller or shorter pleats may allow for the rods to be spaced further apart.

Figure 9:
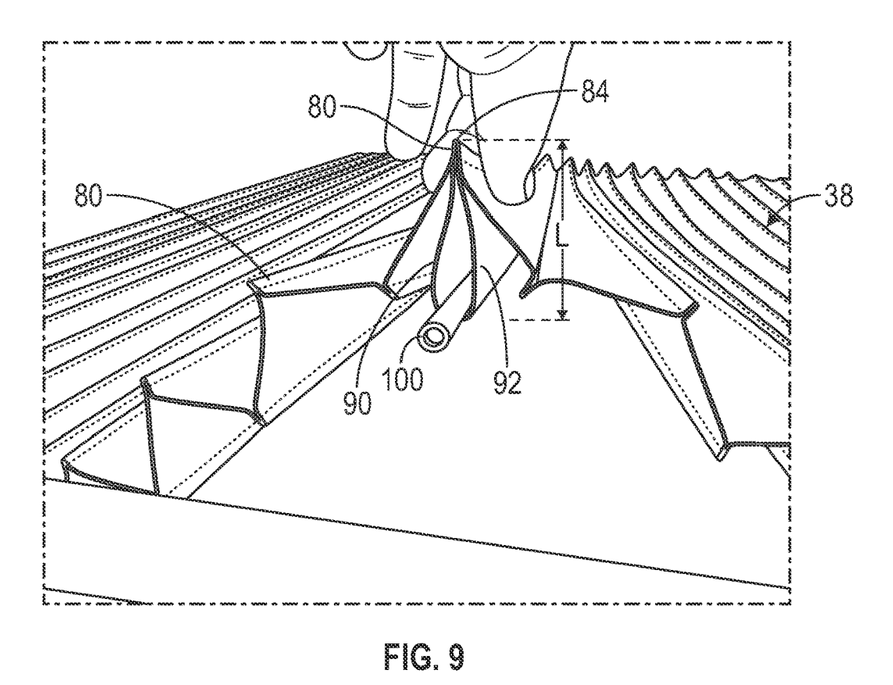
FIG. 9 is a close-up view of the thermal barrier with an open pocket with a support rod.
Figure 10:
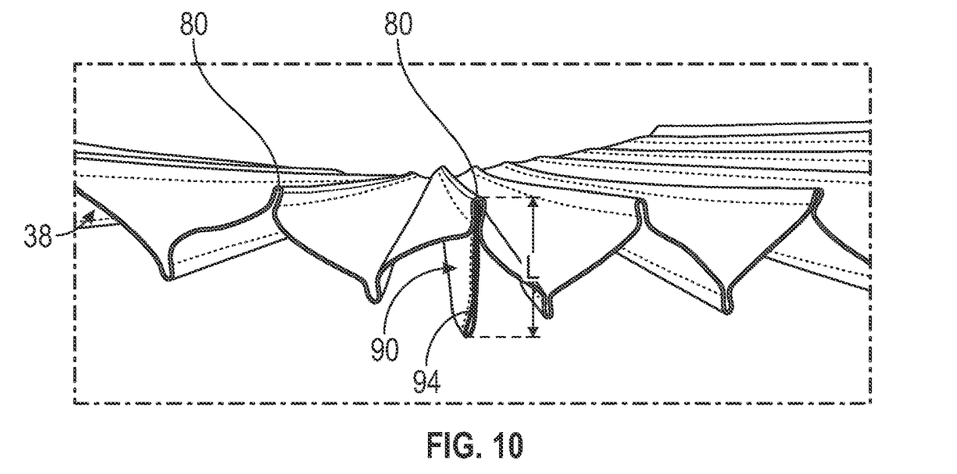
FIG. 10 is a close-up view of the thermal barrier with the pocket closed and retaining the support rod.

Referring to FIGS. 9 and 10, a pocket 90 is integral along the width W of the second baffle section 38 at the top edge 84 of the pleat. Typically, the pocket 90 is stitched into the pleats However, other securing mechanisms are within the scope of the present disclosure including, but not limited to glue, adhesive, buttons and snaps. The pocket 90 has a length such that a lower end 92 is proximate the bottom edge of the second baffle section 38 when in the compressed state where the pleats 80 are substantially adjacent to each other, as illustrated in FIG. 2 with the first baffle section 30.

A support rod 100 is inserted into an interior cavity 92 of the pocket 90 where the support rod 100 such that ends of the support rod 100 rest on the substantially horizontal portions 62 and 68 of the "L" shaped members 60 and 66. While a hollow rod is illustrated, the support rod 100 can have any cross sectional geometry and can be constructed of any suitable material that is sufficiently light weight while being capable of withstanding printing temperatures and have sufficient strength to prevent the first and second baffle sections 32 and 38 from sagging or buckling during the printing process. By way of example, the support rods 100 can be made of carbon fiber, and could also be made of any suitable metal, such as steel or aluminum, or another composite material besides a carbon fiber. Carbon fiber rods are suitable for operation at heated chamber temperatures of up to 250° C. In the case where heated chamber temperatures exceed 250° C., the support rods could also be made of a suitable metal, such as steel or aluminum, or another high temperature composite material The support rods 100 must not deform or soften at printer operating temperatures. A hollow support rod 100 of larger diameter has significantly greater resistance to bending or sagging than a smaller, solid rod. Depending on the material selected, support rods 100 of an outer diameter as low as 0.17" have been found to successfully support the weight of the first or second baffle section 32 and 38 without sagging. In another example, 0.25" OD and 0.21" ID hollow carbon fiber rods were used. In yet another example, 0.197" OD and 0.118" ID hollow carbon fiber rods were used. In another example, 0.196" OD solid carbon fiber rods were used successfully.

As an example, a sufficiently rigid support rod implementation would resist bending or sagging during heated printing operations. For example, stiffening rods smaller than 0.17" may sag unfavorably when used in the first or second baffle section 32 or 38 of 35" width. Although the first and second baffle sections 32 and 38 are not meant to withstand the placement of weights on their top surface, they may be subjected to additional load if maintenance personnel place tools or other items on its top surface while performing tasks. Without the support rods 100, the first and/or second baffle sections 32 and 38 would fall into the heated chamber, and may damage internal printer activities or components.

Additionally, the higher the temperature is in the heated chamber, the more rigid both the baffle section fabric, pleats, and support rods need to be in order to support its weight during printing. As the thickness of the baffle section fabric is increased, the number of support rods can be reduced, or the spacing increased. However, with increasing baffle section thickness, it becomes more difficult to contract the baffle sections so that the baffle sections do not limit the print head movement as it nears the chamber wall areas. Also, as the support rods used are increased in diameter, they may also limit the ability to contract the isolator enough that it also limits print head movement. For example, using a stiffening rod of more than 0.25" in diameter can be too large for good baffle section compaction, or too heavy for easy movement by the gantry, such as in the case of a solid steel support rod. Another approach for stiffening the thermal isolator would be to increase the individual pleat heights, but then then additional machine height must be added to accommodate the large thermal isolator size.

The larger the printer, the larger the baffle section width requirement becomes. It has been found that baffle section widths of greater than 25" require stiffening support in addition to the typically known approaches for design which feature fabric thickness and single or double ply accordion pleat variations. By way of non-limiting example, baffle section widths of up to 44" have successfully used stiffening rods with double pleated thermal isolator fabric, while allowing for compaction and good printer head movement.

Once the support rod 100 is positioned with in the interior cavity 92 of the pocket 90, the ends 94 may be sealed closed such as with stitching to retain the support rod 100 within the pocket 90 as the second baffle section 38 expands and contracts. While stitching is disclosed and illustrated to secure the rod 100 within the pocket 90, other securing members are also contemplated, including but not limited to glue, adhesive, snaps and buttons. Alternatively, the ends 92 of the pocket 90 can be left open while retaining the support rod 100 therein. Alternatively, the second baffle section 38 can include cavities along a bottom fold configured to retain the spaced apart support rods.

Although the present disclosure may have been described with reference to preferred embodiments, workers skilled in the art will recognize that changes may be made in form and detail without departing from the spirit and scope of the disclosure.

The invention claimed is:

1. A build chamber for a 3D printer, the build chamber comprising:
   a heated build space in an interior of the build chamber;
   a thermal isolator configured to insulate 3D printer components from the heated build space, comprising a first baffle section and a second baffle section, each of the first baffle section and the second baffle section comprising:
   an accordion-pleated panel having a length, a width, a first end and a second end, wherein the panel comprises parallel alternating top folds and bottom folds along the width forming a series of pleats, and each pleat within the series being configured to expand and contract, and wherein the panel is constructed of a heat-resistant material; and
   support rods affixed to the accordion-pleated panel in parallel to the pleats and at intervals ranging from about every three pleats to about every eight pleats along the length of the panel, the support rods substantially spanning the width of the panel, wherein ends of the support rods rest on opposing surfaces proximate a ceiling of the build chamber to support the first and second baffle sections, wherein the support rods are configured to provide sufficient strength and rigidity to the panel to substantially prevent the panel from sagging or buckling into the heated build space as the panel is expanded and contracted along its length.

2. The build chamber of claim 1, wherein the support rods are contained in pockets stitched into the accordion folds or attached by mechanical or adhesive means to the accordion folds.

3. The build chamber of claim 1, and further comprising a plurality of pockets integral with the pleats, and wherein the support rods are contained within the pockets.

4. The build chamber of claim 3, wherein the pockets are stitched within the top folds of the panel or the bottom folds of the panel.

5. The build chamber of claim 4, wherein ends of the pockets are stitched closed to retain the support rod therein.

6. The build chamber of claim 1, wherein the support rods are carbon fiber rods.

7. The build chamber of claim 1, wherein the heat resistant material is fiberglass, polytetrafluoroethylene (PTFE), or PTFE-coated fiberglass.

8. The build chamber of claim 1 and further comprising:
   a first end plate securing the first end of each accordion-pleated panel to the build chamber; and
   a second end plate secured to the second end of each accordion-pleated panel for securing the second end plate to a gantry bridge of the 3D printer.

9. A 3D printer comprising:
   a heated build chamber;
   at least one print head configured to move in an x-y plane to print the layers of a part;
   a thermal isolator configured to insulate components on an inlet side of the print head from the heated build space and forming a portion of a ceiling of the heated chamber, the thermal isolator comprising a first baffle section and a second baffle section secured to components of the thermal isolator that engage the print head and/or move the print head in the x-y plane, each of the first baffle section and the second baffle section comprising:
   an accordion-pleated panel having a length, a width, a first end and a second end, wherein the panel comprises a parallel alternating top folds and bottom folds along the width forming a series of pleats, and each pleat within the series being configured to expand and contract, and wherein the panel is constructed of a heat-resistant material; and
   support rods affixed to the accordion-pleated panel in parallel to the pleats and at intervals ranging from about every three pleats to about every eight pleats along the length of the panel, the support rods substantially spanning the width of the panel, wherein ends of the support rods are supported on opposing surfaces proximate the heated build chamber to support the first and second baffle sections, wherein the support rods are configured to provide sufficient strength and rigidity to the panel to substantially prevent the panel from sagging or buckling into the heated build space as the panel is expanded and contracted along its length.

10. The 3D printer of claim 9, wherein the support rods are contained in pockets stitched into the accordion folds or attached by mechanical or adhesive means to the accordion folds.

11. The 3D printer of claim 9, and further comprising a plurality of pockets integral with the pleats, and wherein the support rods are contained within the pockets.

12. The 3D printer of claim 9, wherein the pockets are stitched within the top folds of the panel or the bottom folds of the panel.

13. The 3D printer of claim 12, wherein ends of the pockets are stitched closed to retain the support rod therein.

14. The 3D printer of claim 9, wherein the support rods are carbon fiber rods.

15. The 3D printer of claim 9, wherein the heat resistant material is fiberglass, polytetrafluoroethylene (PTFE), or PTFE-coated fiberglass.

16. The 3D printer of claim 9 and further comprising:
a first end plate securing the first end of each accordion-pleated panel to the build chamber; and
a second end plate secured to the second end of each accordion-pleated panel for securing the second end plate to a gantry bridge of the 3D printer.

* * * * *